US010819661B2

(12) United States Patent
Lawson et al.

(10) Patent No.: US 10,819,661 B2
(45) Date of Patent: Oct. 27, 2020

(54) SYSTEMS AND METHODS FOR DETECTING COMPONENT ROTATION WITHIN A COMMUNICATION ASSEMBLY (71) Applicant: CommScope Technologies LLC, Hickory, NC (US)

(72) Inventors: Jonathan T. Lawson, Cottage Grove, MN (US); Laxman R. Anne, Eden Prairie, MN (US); Thomas Marcouiller, Shakopee, MN (US); Oscar Bran De Leon, Belle Plaine, MN (US); Loren Mattson, Shakopee, MN (US)

(73) Assignee: CommScope Technologies LLC, Hickory, NC (US)

(*) Notice: Subject to any disclaimer, the term of this patent is extended or adjusted under 35 U.S.C. 154(b) by 6 days.

(21) Appl. No.: 15/433,244

(22) Filed: Feb. 15, 2017

(65) Prior Publication Data

US 2017/0163573 A1 Jun. 8, 2017

Related U.S. Application Data (62) Division of application No. 14/285,835, filed on May 23, 2014, now Pat. No. 9,578,401.

(Continued)

(51) Int. Cl.
*G02B 6/00* (2006.01)
*H04B 10/077* (2013.01)
(Continued)

(52) U.S. Cl.
CPC ............ *H04L 49/65* (2013.01); *G02B 6/3825* (2013.01); *G02B 6/3895* (2013.01);
(Continued)

(58) Field of Classification Search
CPC ............ G02B 6/00; H04B 10/77; H04L 12/26
(Continued)

(56) References Cited

U.S. PATENT DOCUMENTS 4,880,291 A * 11/1989 Aberson, Jr. ........ G02B 6/3821
385/55
5,147,209 A * 9/1992 Litwin ................... H05K 1/141
439/70

(Continued)

OTHER PUBLICATIONS

U.S. Patent Office, "Notice of Allowance", "from U.S. Appl. No. 14/285,835", dated Oct. 7, 2016, pp. 1-9, Published in: US.

(Continued)

*Primary Examiner* — Kaveh C Kianni
(74) *Attorney, Agent, or Firm* — Fogg & Powers LLC (57) ABSTRACT Systems and methods for detecting component rotation within a communication assembly are provided. In certain embodiments, a system includes a module; an adapter block that includes multiple front ports and multiple rear ports configured to receive an optical connector; a managing entity configured to control port identification for the front and rear ports; and a circuit board mounted to the adapter block, wherein the circuit board comprises multiple front contact assemblies and multiple rear contact assemblies, wherein each front port is associated with a front contact assembly and each rear port is associated with a rear contact assembly, wherein when a rear contact assembly is electrically coupled to a connector, the connector generates an event that is sent to the managing entity, whereupon the managing entity remaps the port identification for the front and rear ports.

11 Claims, 4 Drawing Sheets

Related U.S. Application Data (60) Provisional application No. 61/857,850, filed on Jul. 24, 2013.

(51) Int. Cl.
| | | |
|---|---|---|
| *H04L 12/26* | (2006.01) | |
| *H04L 12/931* | (2013.01) | |
| *H04Q 11/00* | (2006.01) | |
| *G02B 6/38* | (2006.01) | |
| *G02B 6/44* | (2006.01) | |

(52) U.S. Cl.
CPC ............ *H04L 43/065* (2013.01); *H04L 49/40* (2013.01); *H04Q 11/0067* (2013.01); *G02B 6/4452* (2013.01); *H04Q 2011/0081* (2013.01); *H04Q 2011/0083* (2013.01)

(58) Field of Classification Search
USPC ........................................................ 370/255
See application file for complete search history.

(56) References Cited

U.S. PATENT DOCUMENTS

| | | | | | |
|---|---|---|---|---|---|
| 5,394,503 | A * | 2/1995 | Dietz, Jr. | ............ | G02B 6/3817 |
| | | | | | 385/134 |
| 5,715,348 | A * | 2/1998 | Falkenberg | .......... | G02B 6/4452 |
| | | | | | 385/135 |
| 5,765,198 | A * | 6/1998 | McCrocklin | ........ | G06F 12/0653 |
| | | | | | 711/154 |
| 5,909,298 | A * | 6/1999 | Shimada | ............. | G02B 6/4452 |
| | | | | | 385/134 |
| 6,002,331 | A * | 12/1999 | Laor | .................... | G02B 6/3807 |
| | | | | | 324/539 |
| 6,041,374 | A * | 3/2000 | Postman | ............... | G06F 1/1626 |
| | | | | | 710/2 |
| 6,179,475 | B1 * | 1/2001 | Takamatsu | ........... | G02B 6/3825 |
| | | | | | 385/53 |
| 6,375,362 | B1 * | 4/2002 | Heiles | ................. | G02B 6/3827 |
| | | | | | 385/135 |
| 6,459,175 | B1 * | 10/2002 | Potega | .................. | B60L 11/185 |
| | | | | | 307/132 M |
| 6,757,753 | B1 * | 6/2004 | DeKoning | ............ | G06F 3/0605 |
| | | | | | 710/36 |
| 6,971,895 | B2 * | 12/2005 | Sago | ...................... | G02B 6/3895 |
| | | | | | 439/188 |
| 9,578,401 | B2 | 2/2017 | Lawson et al. | | |
| 2001/0049221 | A1 * | 12/2001 | Abbott | ................. | H01R 13/641 |
| | | | | | 439/488 |
| 2002/0064349 | A1 * | 5/2002 | Ngo | ..................... | G02B 6/3825 |
| | | | | | 385/53 |
| 2002/0081076 | A1 * | 6/2002 | Lampert | ............. | G02B 6/3895 |
| | | | | | 385/70 |
| 2002/0146033 | A1 * | 10/2002 | Benayoun | ............ | H04L 49/351 |
| | | | | | 370/465 |
| 2003/0002808 | A1 * | 1/2003 | Lampert | ............. | G02B 6/3825 |
| | | | | | 385/70 |
| 2004/0052471 | A1 * | 3/2004 | Colombo | ............ | G02B 6/3895 |
| | | | | | 385/53 |
| 2004/0054761 | A1 * | 3/2004 | Colombo | ................ | H04L 41/00 |
| | | | | | 709/220 |
| 2005/0100033 | A1 * | 5/2005 | Arndt | .................. | H04L 67/1097 |
| | | | | | 370/412 |
| 2005/0120173 | A1 * | 6/2005 | Minowa | ................ | G06F 13/385 |
| | | | | | 711/114 |
| 2007/0072474 | A1 * | 3/2007 | Beasley | ................ | H02J 7/0042 |
| | | | | | 439/332 |
| 2007/0147267 | A1 * | 6/2007 | Holland | .............. | H04L 67/1097 |
| | | | | | 370/252 |
| 2007/0276965 | A1 * | 11/2007 | Johnson | ............... | G05B 19/042 |
| | | | | | 710/8 |
| 2010/0003000 | A1 | 1/2010 | Rapp et al. | | |
| 2010/0211664 | A1 * | 8/2010 | Raza | .................. | H01R 13/6658 |
| | | | | | 709/223 |
| 2011/0081144 | A1 * | 4/2011 | Zhao | .................... | H04B 10/272 |
| | | | | | 398/20 |
| 2011/0116748 | A1 | 5/2011 | Smrha | | |
| 2011/0123157 | A1 * | 5/2011 | Belsan | ................ | G02B 6/3816 |
| | | | | | 385/75 |
| 2011/0149526 | A1 | 6/2011 | Turner | | |
| 2011/0262077 | A1 | 10/2011 | Anderson et al. | | |
| 2012/0166582 | A1 * | 6/2012 | Binder | .................... | H04L 63/18 |
| | | | | | 709/217 |
| 2013/0089291 | A1 * | 4/2013 | Jol | ........................ | H01R 13/405 |
| | | | | | 385/77 |
| 2013/0108231 | A1 | 5/2013 | Mertesdorf | | |
| 2014/0226460 | A1 * | 8/2014 | Kretschmann | ....... | G05B 19/058 |
| | | | | | 370/218 |
| 2015/0030323 | A1 * | 1/2015 | Lawson | ............. | H04Q 11/0067 |
| | | | | | 398/33 |
| 2015/0339570 | A1 * | 11/2015 | Scheffler | .................. | G06N 3/04 |
| | | | | | 706/16 |

OTHER PUBLICATIONS

U.S. Patent Office, "Office Action", "from U.S. Appl. No. 14/285,835", dated May 12, 2016, pp. 1-21, Published in: US.

International Searching Authority, "International Search Report and Written Opinion from PCT Application No. PCT/US2014/047910 dated Nov. 3, 2014", "from Foreign Counterpart of U.S. Appl. No. 14/285,835", dated Nov. 3, 2014, pp. 1-11, Published in: WO.

U.S. Patent and Trademark Office, "Interview Summary", U.S. Appl. No. 14/285,835, dated Aug. 5, 2016, pp. 1-3, Published: US.

U.S. Patent and Trademark Office, "Restriction Requirement", U.S. Appl. No. 14/285,835, dated Nov. 25, 2015, pp. 1-11, Published: US.

* cited by examiner

SYSTEMS AND METHODS FOR DETECTING COMPONENT ROTATION WITHIN A COMMUNICATION ASSEMBLY

CROSS-REFERENCE TO RELATED APPLICATIONS

This is a Continuation Application, claiming priority to, and the benefit of, U.S. patent application Ser. No. 14/285,835, titled "SYSTEMS AND METHODS FOR DETECTING COMPONENT ROTATION WITHIN A COMMUNICATION ASSEMBLY", filed on May 23, 2014, which claims priority to, and the benefit of, U.S. Provisional Patent Application Ser. No. 61/857,850, titled "SYSTEMS AND METHODS FOR DETECTING COMPONENT ROTATION WITHIN A COMMUNICATION ASSEMBLY", filed on Jul. 24, 2013, and which are each incorporated herein by reference in their entirety.

BACKGROUND

Telecommunications networks typically include numerous logical communication links between various items of equipment. Often a single logical communication link is implemented using several pieces of physical communication media. For example, a logical communication link between a computer and an inter-networking device such as a hub or router can be implemented as follows. A first cable connects the computer to a jack mounted in a wall. A second cable connects the wall-mounted jack to a port of a patch panel, and a third cable connects the inter-networking device to another port of a patch panel. A "patch cord or cable" cross connects the two together. In other words, a single logical communication link is often implemented using several segments of physical communication media.

Various types of physical layer management (PLM) systems can be used to track connections made at patch panels and other types of equipment used to make connections in communication networks. Generally, such PLM systems include functionality to track what is connected to each port of such equipment, trace connections that are made using such equipment, and provide visual indications to technicians at such equipment (for example, by illuminating an LED that is associated with a patch panel or a port thereof).

One exemplary type of PLM system makes use of an Electrically Erasable Programmable Read-Only Memory (EEPROM) or other storage device that is integrated with or attached to a connector on a cable, fiber, or other segment of communication media. The storage device is used to store information about the connector or cable along with other information. The port (or other connector) into which the associated connector is inserted is configured to read the information stored in the EEPROM or other storage device when the connector is inserted at that port. One example of such technology includes the QUAREO family of products that are commercially available from TE Connectivity.

Another type of PLM system makes use of so-called "ninth wire" technology. Ninth wire technology makes use of special cables that include an extra conductor or signal path (also referred to here as the "ninth wire" conductor or signal path) that is used for determining which port each end of the cables is inserted into. Ninth wire technology can be used with various types of cables, such as, twisted-pair copper cables and optical cables (in the latter case using hybrid optical cables that include one or more copper wires that serve as the ninth wire). One example of ninth wire technology includes the AMPTRAC family of products that are commercially available from TE Connectivity.

Another type of PLM system makes use of radio frequency identification (RFID) tags and readers. With this type of RFID PLM system, an RFID tag is attached to or integrated with a connector on a cable, fiber, or other segment of communication media. The RFID tag is used to store information about the connector or segment of communication media along with other information. The RFID tag can be read after the associated connector is inserted into a corresponding jack or other port using an RFID reader.

PLM systems typically include management software that aggregates the captured information and stores it in one or more databases. One example of such management software is the Infrastructure Configuration Manager (ICM) software that is commercially available from TE Connectivity.

In addition to information about the connections and cabling used to make them, these databases also typically store information about the other equipment used to make the connections. Examples of such equipment include patch panels, distribution frames, and active networking devices such as switches, routers, and gateways. Examples of information that is stored in the database about such equipment include information about the make and model of the equipment and where it is installed in the network.

Typically, information about where such equipment is installed in the network must be manually entered. This is commonly the case even for "intelligent" equipment that can be automatically discovered by the PLM management software and queried for its identification information (for example, serial number and make and model).

For example, in one common usage scenario, a frame is installed in an equipment room or data center of an enterprise or in a central office of a telecommunication service provider. The frame is designed to house multiple sub-assemblies that are used to make connections between cables. One example of such a frame is an optical distribution frame (ODF) into which multiple chassis can be inserted. In this example, each chassis is designed to hold multiple adapter packs on one or more trays that slide in and out of the chassis. Each adapter pack comprises multiple optical adapters, where each of the optical adapters is configured to optically connect an optical cable terminated with an optical connector (such as an LC or SC connector) with another optical cable terminated with a corresponding optical connector.

Each optical adapter in each adapter pack can be designated as a port in the adapter pack. When an adapter pack is installed in a chassis, there is a chance that the adapter pack may be installed in a reversed position because, in certain applications, one side of an adapter pack that connects to optical connectors may be indistinguishable from an opposite side that likewise connects to optical connectors. When an adapter pack is in a reversed position, the management software may incorrectly identify the different ports in the adapter pack.

As noted above, even when the frame includes some type of PLM intelligence that enables the frame to be discovered by PLM management software and queried for identification information associated with that frame (for example, a serial or other identification number and a make and model), location information for that frame typically must be manually entered into the PLM management system (for example, using a Web interface or mobile application). This is because the frame is typically not aware of where it is located. The PLM management system is then able to associate the manually entered location information with the identification information that the PLM management software was able to automatically discover.

Also, whenever a sub-assembly (for example, an optical chassis of the type noted above) is installed in the frame, location information for that sub-assembly must also be manually entered into the PLM management system. The location information for each sub-assembly includes where that sub-assembly is located (for example, a physical location and/or which frame the sub-assembly has been inserted into) as well as which slot or position within the frame into which the sub-assembly has been inserted.

The location information for each such sub-assembly typically must be manually entered even if the sub-assembly otherwise includes PLM intelligence that enables the sub-assembly to be discovered and queried by the PLM management software for its identification information. This is because the sub-assembly typically is not aware of where it is located. The need to manually enter location information for the sub-assembly adds an additional manual step to the work-flow associated with installing the sub-assembly, which increases the time required to complete the work flow and which can result in incorrect data being manually entered. Moreover, it is common that when a frame is initially deployed, less than the maximum number of sub-assemblies that could be housed in that frame are actually installed in the frame during the initial deployment. As a result, location information for the various sub-assemblies in a given frame might be manually entered by different people at different times.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

Figure 1:
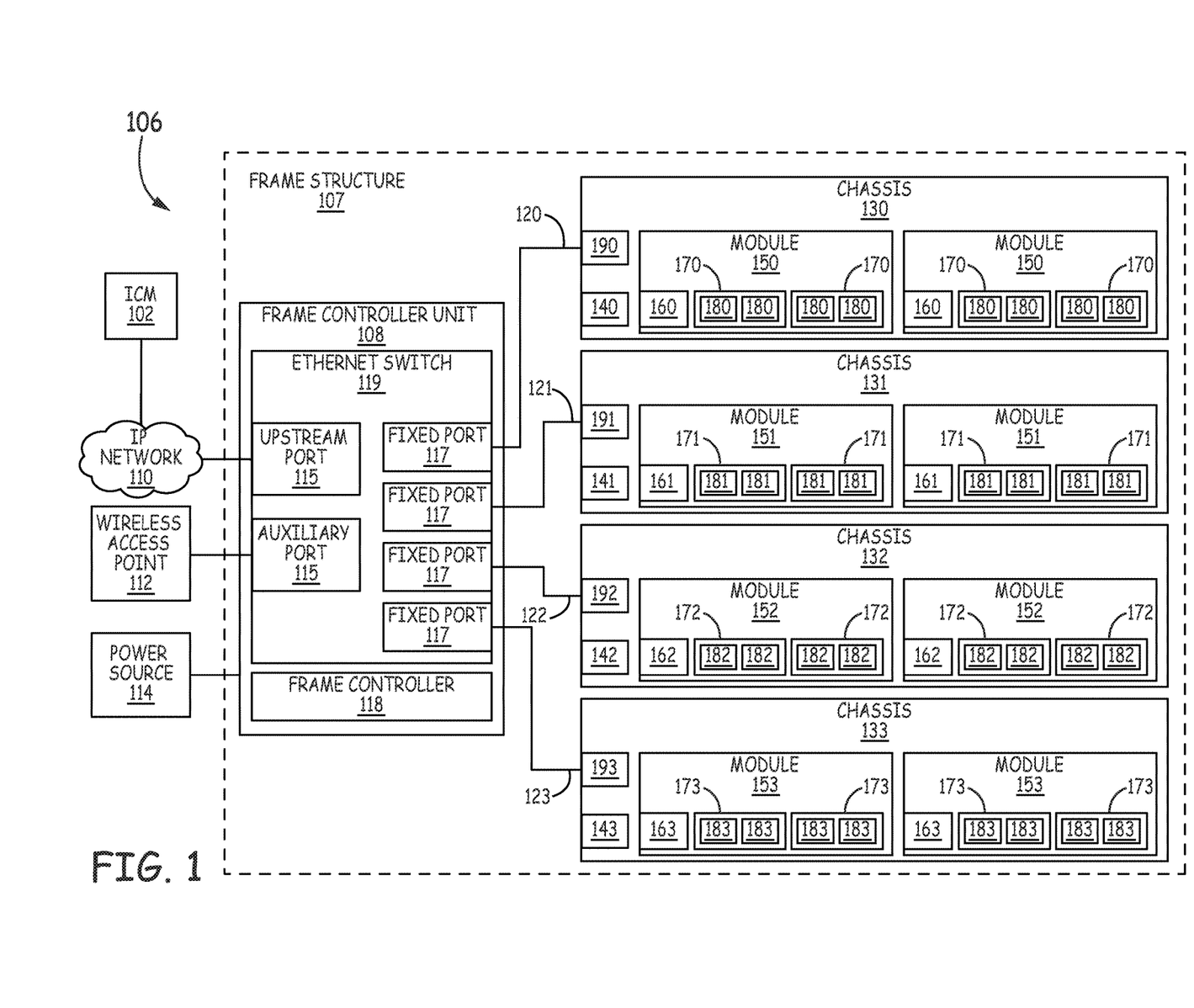
FIG. 1 is a block diagram of an exemplary embodiment of a communication system.

FIG. 1 shows one exemplary embodiment of a system that can be used to automatically associate location information with communication sub-assemblies 130-133 that are inserted into a larger communication assembly 106. The larger communication assembly 106 into which the communication sub-assemblies 130-133 can be inserted is configured to physically hold the sub-assemblies 130-133 in place. The assembly 106 includes a plurality of slots or positions and each of the sub-assemblies 130-133 is inserted into one of the positions in the assembly 106. Each sub-assembly 130-133 is used to make connections between various cables (such as fiber optic cables terminated with LC, SC, Multiple-Push-On (MPO) connectors or copper cables such as CAT-5 or CAT-6 twisted-pair cables terminated with RJ-45 connectors).

In the exemplary embodiment described here in connection with FIG. 1, the assembly 106 comprises an optical distribution frame 106 (also referred to here as the "optical distribution frame" 106 or simply the "frame" 106). Also, in this exemplary embodiment, the sub-assemblies 130-133 comprise chassis 130-133 that are configured to hold multiple fiber optic modules 150-153 (for example, in a 4 Rack Unit (RU) sized chassis). The sub-assemblies 130-133 are also referred to here as the "chassis" 130-133. The optical distribution frame 106 comprises a frame structure 107 that is configured to have a plurality of positions, where a chassis 130-133 can be inserted into each of the positions. For ease of explanation, the frame 106 is shown in FIG. 1 as being configured to house up to four chassis 130-133, and each chassis 130-133 is shown as being configured to house up to two fiber optic modules 150-153; however, it is to be understood that the frame 106 can be configured to house any number of chassis 130-133, and each chassis 130-133 can be configured to house any number of fiber optic modules 150-153.

Each optical module 150-153 is implemented as an optical tray that is configured to hold at least one multiple adapter pack 170-173. Each adapter pack 170-173 comprises multiple optical adapters 180-183, where each of the optical adapters 180-183 is configured to optically connect an optical cable (not shown) terminated with an optical connector (such as an LC, SC, or a Multi-fiber Push On (MPO) connector) with another optical cable (not shown) terminated with a corresponding optical connector. Again, for ease of explanation, in FIG. 1, each module 150-153 is shown as holding two adapter packs 170-173, and each adapter pack 170-173 is shown in FIG. 1 as holding up to two adapters 181; however, it is to be understood that each module 150-153 can be configured to hold any number of adapter packs 170-173, and each adapter pack 170-173 can be configured to hold any number of optical adapters 180-183. Also, it is to be understood that the techniques described here can be used for other types of connection devices including, for example, ones where a single cable (or a single cable bundle) is broken out in order to be connected to multiple cables or cable bundles (such as, for example, MPO, splitter, or cassette type devices).

In the exemplary embodiment described herein connection with FIG. 1, each of the connectors includes a respective non-volatile storage device (such as an EEPROM) that is used to gather information about the connector or the cable (for example, identification information for the cable or connector such as serial number or other identifier and make and model). Each module 150-153 includes a respective module controller 160-163. Each module 150-153 and the corresponding adapter packs 170-173 and optical adapters 180-183 are configured so that the module controller 160-163 for that module 150-153 can determine whether a connector is inserted into each optical adapter 180-183 and read the storage device associated with that inserted connector (if there is one). For example, each optical adapter 180-183 includes one or more contacts or terminals that come into electrical contact with corresponding contacts or terminals on any connector that is inserted into the adapter 180-183, where such contacts or terminals are used to electrically couple the storage device for that connector to the corresponding module controller 160-163 so that the module controller 160-163 can determine if a connector is inserted into each optical adapter 180-183 and read information from a storage device attached to such a connector (if any). In some applications, the data read from the storage device is used to track connections made at the frame 106. In some applications, connectors that include such storage devices are not used and, instead, connections are tracked by inferring connections using the functionality that determines whether a connector is inserted in each adapter or port. In some applications, a combination of the foregoing approaches is used.

Examples of such chassis 130-133, modules 150-153, adapter packs 170-173, and optical adapters 180-183 are described in the following United States Provisional Patent Applications: U.S. Provisional Patent Application Ser. No. 61/761,048, filed on Feb. 5, 2013, titled "Optical Assemblies with Managed Connectivity"; U.S. Provisional Patent Application Ser. No. 61/761,034, filed on Feb. 5, 2013, titled "Optical Assemblies with Managed Connectivity"; U.S. Provisional Patent Application Ser. No. 61/761,042, filed on Feb. 5, 2013, titled "Optical Assemblies with Managed Connectivity"; U.S. Provisional Patent Application Ser. No. 61/761,009, filed on Feb. 5, 2013, titled "Slidable Telecommunications Tray with Cable Slack Management"; and U.S. Provisional Patent Application Ser. No. 61/763,347, filed on Feb. 11, 2013, titled "Slidable Telecommunications Tray with Cable Slack Management". All of the preceding applications are incorporated herein by reference.

Each of the adapter packs 170-173 contains multiple adapters also known as ports. For example, an adapter pack, such as adapter pack 170, may have 24 ports divided between two opposing sides of the adapter pack 170. The adapter pack 170 provides connectivity between optical connectors that may have LC, SC, Multiple-Push-On (MPO) type connectors. In certain implementations, for example, when the adapter pack 170 provides an LC/LC connection, an SC/SC connection, an LC/SC connection, an MPO/MPO connection, or the like, the opposite sides of the adapter pack 170 may appear identical. Due to the same appearance of the opposite sides of the adapter pack 170, a user may install the adapter pack 170 in a normal position and a reversed position.

To determine whether an adapter pack 170 is installed in a normal position or a reversed position, each port in the adapter pack 170 includes at least one general purpose input/output (GPIO) pin. On opposing sides of the adapter pack 170, the GPIO pins in the ports are tied to different voltage levels, such that the connectors can determine which side of the adapter pack is connected to the adapters. For example, on one side of the adapter pack 170, the GPIO pins are tied to a relatively high voltage level, while on the opposite side of the adapter pack 170, the GPIO pins are tied to a low voltage. When a connector connects to a port in the adapter pack 170, the connector uses the voltage level of the GPIO pin to determine if the adapter pack 170 is in a normal position or reversed position.

In at least one exemplary implementation, when the adapter pack 170 is in a normal position, the connector is connected to a port in the adapter pack 170 where the GPIO pin is providing a high voltage level. As the adapter pack 170 is in the normal position, the connector connects to the port in the adapter pack 170 and functions according to normal operations. In contrast, when the adapter pack 170 is in a reversed position, the connector connects to a port in the adapter pack 170 where the GPIO pin is providing a low voltage level. Because the GPIO pin is providing a low voltage, the connector notifies a management entity 102. For example, a connector generates an event that is transmitted to the management entity 102. Where the management entity 102 reverses the port numbering of the different ports in the adapter pack 170. Further, the GPIO pin can be part of adapter packs 170-173 in the frame structure 107.

In a further exemplary implementation, a module 150 may be installed in the chassis in either a normal position or a reverse position. Like the adapter packs 170-173, a module 150 may include a GPIO pin that indicates whether a module is installed in the normal or reverse position. When the module 150 is installed in a normal position, there are no events generated through the module GPIO pin that are communicated to the management entity 102. However, when the module is installed in a reverse position, the module GPIO pin raises a module event that is communicated to the management entity 102. Upon receiving a module event indicating that a module 150 is installed in a reverse position, the management entity 102 may indicate that the module 150 is in a reverse position to a user or an administrator of the frame 106. However, in at least one exemplary implementation in contrast to the adapter packs 170-173, the management entity 102 does not remap ports when a module is installed in the reverse position.

In the exemplary embodiment shown in FIG. 1, each chassis 130-133 includes a respective master controller 140-143 that is electrically coupled to the module controller 160-163 for each module 150-153 that is included in that chassis 130-133 (for example, using a respective flex circuit interconnect). In this exemplary embodiment, the master controller 140-143 and its associated module controllers 160-163 are configured to use a master-slave scheme for communicating with one another. In such a scheme, the master controller 140-143 serves as the "master," and each of the module controllers 160-163 serves as a "slave." For example, in one implementation of such a scheme, each module controller 160-163 determines when a connector has been inserted into an optical adapter 180-183 associated with that module controller 160-163 and reads information from the storage device attached or otherwise associated with that connector. When prompted to do so by the associated master controller 140-143, each module controller 160-163 informs the master controller 140-143 of any state changes for any of the optical adapters 180-183 associated with that module controller 160-163 (for example, that a connector has been inserted or removed from an optical adapter 180-183) and forwards to the master controller 140-143 information read from storage devices inserted into optical adapters 180-183 associated with that module controller 140-143.

In the exemplary embodiment shown in FIG. 1, each chassis 130-133 includes an at least one management network interface 190-193 that can be used to couple the master controller 140-143 to an IP network 110 that is used for communicating the PLM information described below to a management entity 102. In an example implementation of such an embodiment, the management network interface 190-193 for each chassis 130-133 is implemented using an ETHERNET network interface (and associated RJ-45 port) so that the corresponding master controller 140-143 can be coupled to the IP network 110 using a CAT-5 or CAT-6 twisted-pair copper cable. It is to be understood, however, that the management network interface 190-193 can be implemented in other ways.

It is noted that, for ease of explanation, the IP network 110 is shown using a separate cloud symbol, but it is to be understood that the frame 106, chassis 130-133, and cabling described here can be used to implement a part of the IP network 110 over which the PLM information is communicated. Alternatively, the IP network 110 over which the PLM information is communicated can be kept separate from the network that the frame 106, chassis 130-133, and cabling are a part of.

The management entity 102 is typically implemented as software that runs on a computer that is coupled to the IP network 110. The management entity 102 is configured to receive information pertaining to various devices and media used to implement the physical layer in the network (including, but not limited to, the chassis 130-133 and frame 106 and the cables and connectors that make connections there). The physical layer information (PLI) that is communicated to the management entity 102 includes information about various devices in the network (also referred to here as "device information") as well as information about any segments of physical communication media attached to the ports of those devices (also referred to here as "media information"). The device information includes, for example, an identifier for each device, a type identifier that identifies the device's type, and port information that includes information about the device's ports. The media information includes information that is read from storage devices that are attached to various segments of physical communication media.

Examples of media information that can be stored in such storage devices include, without limitation, an identifier that uniquely identifies that particular segment of physical communication media (similar to an ETHERNET Media Access Control (MAC) address but associated with the physical communication media and/or connector attached to the physical communication media), a part number, a plug or other connector type, a cable or fiber type and length, a serial number, a cable polarity, a date of manufacture, a manufacturing lot number, information about one or more visual attributes of physical communication media or a connector attached to the physical communication media (such as information about the color or shape of the physical communication media or connector or an image of the physical communication media or connector), and other information used by an Enterprise Resource Planning (ERP) system or inventory control system. In other embodiments, alternate or additional data is stored in such storage devices. For example, testing, media quality, or performance information can be stored in such storage devices. The testing, media quality, or performance information, for example, can be the results of testing that is performed when a particular segment of media is manufactured or installed.

The information provided to the management entity 102 can also include information that is manually entered (for example, using a Web interface that is implemented by the management entity 102 or a mobile application).

The management entity 102 includes or uses a database or other data store (not shown) for storing the information provided to it. The management entity 102 also includes functionality that provides an interface for external devices or entities to access the physical layer information maintained by the management entity 102. This access can include retrieving information from the management entity 102 as well as supplying information to the management entity 102. In this example, the management entity 102 is implemented as "middleware" that is able to provide such external devices and entities with transparent and convenient access to the information maintained by the management entity 102. Because the management entity 102 aggregates information from the relevant devices in the network and provides external devices and entities with access to such information, the external devices and entities do not need to individually interact with all of the devices in the network that provide information to the management entity 102, nor do such devices need to have the capacity to respond to requests from such external devices and entities.

The management entity 102, in this example, implements an application programming interface (API) by which application-layer functionality can gain access to the physical layer information maintained by the management entity 102 using a software development kit (SDK) that describes and documents the API.

More information about physical layer information and the aggregation point 152 can be found in U.S. Provisional Patent Application Ser. No. 61/152,624, filed on Feb. 13, 2009, titled "MANAGED CONNECTIVITY SYSTEMS AND METHODS" and U.S. patent application Ser. No. 12/705,497, filed on Feb. 12, 2010, titled "AGGREGATION OF PHYSICAL LAYER INFORMATION RELATED TO A NETWORK", both of which are hereby incorporated herein by reference.

In the exemplary embodiment shown in FIG. 1, the master controller 140-143 in each chassis 130-133 is configured to interact with, monitor, and/or control the operation of the components of the chassis 130-133 (for example, any buttons (or other input components) and any light emitting diodes (LEDs) (or other visual indicators) incorporated into the body of the chassis 130-133 itself) as well as the module controllers 180-183. Also, the master controller 140-143 in each chassis 130-133 is configured to interact with external entities via the IP network 110. For example, each master controller 140-143 is configured to implement appropriate functionality and protocols for the master controller 140-143 to obtain an IP address (for example, a static IP address that is manually assigned to the master controller 140-143 via a Web or mobile app interface that is implemented by the master controller 140-143 or a dynamic IP address that is assigned to the module controller 140-143 via a Dynamic Host control Protocol (DHCP) server for the IP network 110). Also, each master controller 140-143 is configured to implement appropriate functionality and protocols for the master controller 140-143 to be discovered by, and to discover, the management entity 102. This discovery of and by the managing entity 102 can be done manually (for example, by manually providing an address for the master controller 140-143 to the managing entity 102 and by manually providing an address for the managing entity 102 to the master controller 140-143 using, for example, a Web or mobile app interface implemented by the master controller 140-143 and the managing entity 102) or automatically (for example, using a suitable discovery protocol such as the Universal Plug and Play (UPnP) discovery protocol).

In the exemplary embodiment shown in FIG. 1, the frame 106 includes a frame controller unit 108 that is attached to the structure that implements the frame. For example, in one implement of such embodiment, the frame controller unit 108 is attached to the top of such structure. In other implementations, the frame controller unit 108 is located elsewhere in the frame 106 (for example, on the bottom of the frame structure).

In this embodiment, the frame controller unit 108 includes a frame controller 118 and an ETHERNET switch 119. The frame controller 118 is configured to interact with, monitor, and/or control the operation of the components of the frame controller unit 108 (for example, the ETHERNET switch 119 as well as any buttons (or other input components) and any light emitting diodes (LEDs) (or other visual indicators) incorporated into the frame controller unit 108) and the frame 106 (for example, any LEDs that are mounted to the frame 106 itself). Also, the frame controller 118 is configured to interact with external entities via the IP network 110. For example, the frame controller 118 is configured to implement appropriate functionality and protocols for the frame controller 118 to obtain an IP address (for example, a static IP address that is manually assigned to the frame controller 118 via a Web or mobile app interface that is implemented by the frame controller 118 or a dynamic IP address that is assigned to the frame controller 118 via a DHCP server for the IP network 110). Also, the frame controller 118 is configured to implement appropriate functionality and protocols for the frame controller 118 to be discovered by, and to discover, the management entity 102. This discovery of and by the managing entity 102 can be done manually (for example, by manually providing an address for the frame controller 118 to the managing entity 102 and by manually providing an address for the managing entity 102 to the frame controller 118 using, for example, a Web or mobile app interface implemented by the frame controller and managing entity 102) or automatically (for example, using a suitable discovery protocol such as the UPnP discovery protocol).

The ETHERNET switch 119 includes two sets of ports 115 and 117. One set of ports 115 are standard ETHERNET ports in which ETHERNET cables can be easily inserted and removed in connection with the normal operation of the frame 106. These ports 115 are also referred to here as "standard ports" 115. In the exemplary embodiment shown in FIG. 1, the ETHERNET switch 119 includes two standard ports 115, one of which is used to connect the ETHERNET switch 119 (and the other devices coupled to the other ports 115 and 117 of the switch 119) to the IP network 110. This standard port 115 is also referred to here as the "upstream port" 115. The other standard port 115 is an auxiliary port 115 that can be used, for example, to couple a wireless access point 112 to the IP network 102 or to daisy chain two or more frames 106 (and their associated frame controllers 118) together (for example, as described further in more detail below).

The ETHERNET switch 119 also includes a second set of ports 117 that are configured so that the ETHERNET cables inserted into those ports 117 cannot be easily removed from the ports 117 in connection with the normal operation of the frame 106. In the following description, these ports 117 are also referred to here as the "fixed ports" 117. This can be done using a suitable connector or attachment mechanism.

For each of the fixed ports 117, an ETHERNET cable 120-123 is inserted into that fixed port 117 that is configured to be inserted into the management network interface 190-193 of a chassis 130-133 that is inserted at one particular position in the frame 106 and is configured so that the cable 120-123 cannot be inserted into the management network interface 190-193 of a chassis 130-133 inserted into any of the other positions in the frame 106. This can be done, for example, by routing and attaching each ETHERNET cable 120-123 to the frame 106 so that there is only enough slack at the chassis end of that ETHERNET cable 120-123 to be able to physically reach the management network interface 190-193 of a chassis 130-133 inserted into only one predetermined chassis position in the frame 106 and not be able to physically reach the management network interfaces 190-193 of chassis 130-133 inserted into the other chassis positions in the frame 106.

In this way, a relationship between each of the fixed ports 117 and a particular chassis position in the frame 106 is maintained. This relationship can be used to associate any chassis 130-133 that is directly coupled to that fixed port 117 with that particular chassis position in that particular frame 106. This relationship can be used to automatically associate location information with a chassis 130-133 inserted into the frame 106. This location information for the chassis 130-133 includes, for example, the location of the frame 106 and the chassis position within the frame 106 that the chassis 130-133 is inserted into. The management entity 102 can do this. Also, this can be done by the frame controller 118.

The frame controller 118 is communicatively coupled to the ETHERNET switch 119 so that it is able to communicate with the managing entity 102 via the IP network 110. Also, as is described in more detail below, the frame controller 118 is configured to retrieve from the ETHERNET switch 119 information that maps each of the ports 115 and 117 of the switch 119 to MAC addresses that can be accessed via that switch port (for example, by retrieving the port map table that is maintained by an automatic translation unit (ATU) or lookup engine in the ETHERNET switch 119).

In exemplary embodiment shown in FIG. 1, power can be supplied to the active components of the chassis 130-133 (and the modules 150-153 included therein) using Power over Ethernet (POE). In this embodiment, the ETHERNET switch 119 is configured to source POE power over the ports 115 and the 117 and is coupled to a 48 Volt Direct Current (DC) power source 114 in order to do so. This 48V DC power can also be used to power the active components of the frame 106 (including the frame controller unit 108 and any LEDs attached to the frame 106). It is to be understood, however, that power can be supplied in other ways.

The auxiliary port 115 can also be used to connect multiple frames 106 (and the associated frame controller units 108) in a daisy-chain configuration. In such a configuration, the upstream port 115 for a first frame 106 is connected directly to the IP network 110 (that is, is not connected to the IP network 110 through another one of the frames 106). The upstream port 115 of a second one of the frames 106 is connected to the auxiliary port 115 of the first frame 106, the upstream port 115 of a third one of the frames 106 is connected to the auxiliary port 115 of the second frame 106, and so on. The auxiliary port 115 of the last frame 106 in the daisy chain is not used for implementing the daisy chain and can be used for other purposes (for example, for connecting a wireless access point 115 to the IP network 110). The techniques for automatically associating location information with chassis 130-133 inserted into a frame 106 can be used with such a daisy-chain configuration.

Figure 2:
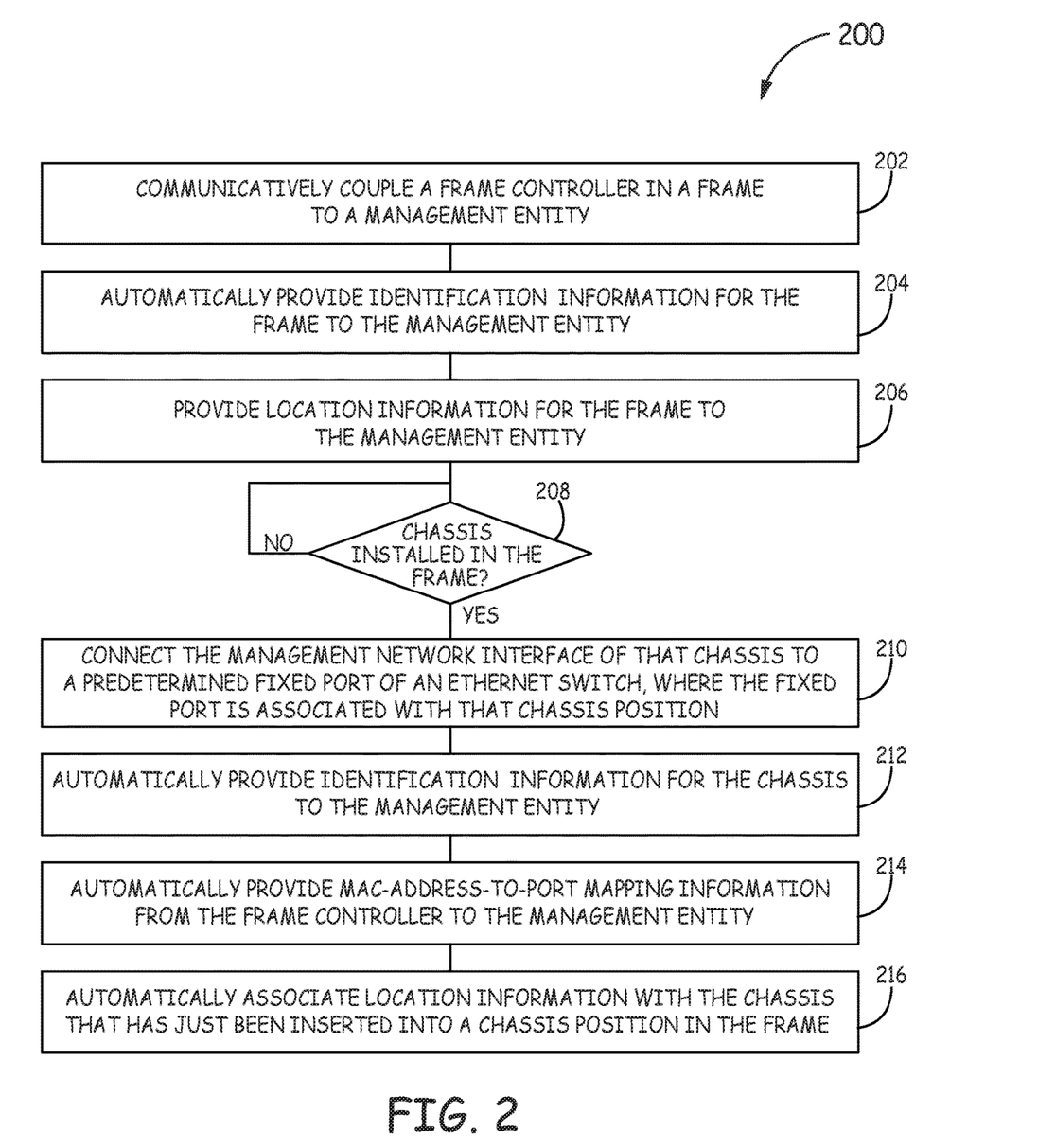
FIG. 2 is a flow diagram of an exemplary embodiment of a method of automatically associating location information with a sub-assembly installed in a frame.

FIG. 2 is a flow diagram of one exemplary embodiment of a method 200 of associating location information with a communication sub-assembly (such as a chassis) that is inserted into a frame (or similar assembly into which multiple communication sub-assemblies can be inserted). The exemplary embodiment shown in FIG. 2 is described here as being implemented using the system shown in FIG. 1, though it is to be understood that other embodiments can be implemented in other ways.

Method 200 comprises communicatively coupling the frame controller 118 in the frame 106 to management entity 102 (block 202). In one common usage scenario, the frame 106 is installed in an equipment room or data center of an enterprise or in a central office of a telecommunication service provider. In this example, the frame controller 118 is connected to the IP network 110 by connecting one of the standard ports 115 of the ETHERNET switch 119 included in the frame controller unit 108 to the IP network 110 using an appropriate cable (for example, a CAT-5 or CAT-6 cable). Then, as described above, the frame controller 118 obtains an IP address (either manually or automatically using, for example, DHCP) and discovers, and is discovered by, the management entity 102 (again, either manually or automatically using UPnP).

Method 200 further comprises automatically providing identification information for the frame 106 to the management entity 102 (block 204). In this example, the management entity 102 automatically obtains identification information for the frame 106 (for example, a serial number and/or another identifier assigned to the frame 106 and/or make and model information for the frame 106) by using the IP network 110 to query the frame controller 118 for such information. Although the identification information is described here as being provided automatically to the management entity 102, it is to be understood that such information could be provided manually. Also, as a part of the information that is provided to the management entity 102, information that identifies which of the fixed ports 117 is associated with which chassis position in the frame 106 is also to be provided to the management entity 102.

Method 200 further comprises providing location information for the frame 106 to the management entity 102 (block 206). In this example, location information for the frame 106 is manually entered and provided to the management entity 102 (for example, using a Web or mobile app interface implemented by the management entity 102). This location information can include, for example, information that specifies a physical location for the frame 106 (for example, GPS coordinates, an address for the building in which the frame 106 is installed, and/or a number or other identifier for the floor, room, and/or row where the frame 106 is installed). This location information can be specified in any suitable away (for example, using absolute and/or relative coordinates or addresses).

Method 200 further comprises, when a chassis 130-133 is installed in the frame 106 in one of the chassis positions (block 208), connecting the management network interface 190-193 of that chassis 130-133 to the predetermined fixed port 117 of the ETHERNET switch 119 that is associated with that chassis position (block 210). In this example, the master controller 140-143 obtains an IP address (either manually or automatically using, for example, DHCP) and discovers, and is discovered by, the management entity 102 (again, either manually or automatically using UPnP). When a chassis 130-133 is not installed in the frame (block 208), the master controller 140-143 waits for a chassis 130-133 to be installed in the frame.

Method 200 further comprises automatically providing identification information for the chassis 130-133 to the management entity 102 (block 212) in connection with the chassis 130-133 being inserted into the frame 106. In this example, the management entity 102 automatically obtains identification information for the chassis 130-133 (for example, a serial number and/or other identifier assigned to the chassis 130-133 and module 150-153, adapter packs 170-173, and adapters 180-183 housed within the chassis 130-133, and any connectors or cables attached thereto, and/or make and model information for any of the foregoing) by using the IP network 110 to query the master controller 140-143 for that chassis 130-133 for such information. Also, in this example, a media access control (MAC) address associated with the management network interface 190-193 is also communicated to the management entity 102.

Method 200 further comprises automatically providing MAC-address-to-port mapping information from the frame controller 118 to the management entity 102 (block 214). In this example, the frame controller 118 reads the routing tables maintained by the ATU or lookup engine in the switch 119 in order come up with the MAC-address-to-port mapping information. This MAC-address-to-port mapping information is provided to the management entity 102 via the IP network 110.

Method 200 further comprises automatically associating location information with the chassis 130-133 that has just been inserted into a chassis position in the frame 106 (block 216). In this example, the management entity 102 does this by using the MAC address for the management network interface 190-193 of that chassis 130-133 to determine which frame 106—and which chassis position within that frame 106—the chassis 130-133 is inserted into. The frame 106 that the chassis 130-133 is inserted into is the one whose MAC-address-to-port mapping information includes the MAC address for the management network interface 190-193. Then, the management entity 102 associates the location information for that frame 106 (which was manually entered in connection with block 206) with that chassis 130-133 (and module 150-153, adapter packs 170-173, and adapters 180-183 in that chassis 130-133 and any connectors or cables attached thereto). Also, the management entity 102 determines the chassis position within that frame 106 by using MAC address for the management network interface 190-193 of that chassis 1301-133 and the MAC-address-to-port mapping information to determine which fixed port 117 that chassis 130-133 is connected to.

In this way, location information can be associated with the chassis 130-133 automatically (that is, without having to manually enter such location information). This eliminates the manual data entry step that would otherwise be needed each time a chassis 130-133 is inserted into the frame 106 and the need for such information to be manually entered by different people at different times, when the frame 106 is initially deployed with less than all of the chassis positions filled with chassis 130-133.

Figure 3:
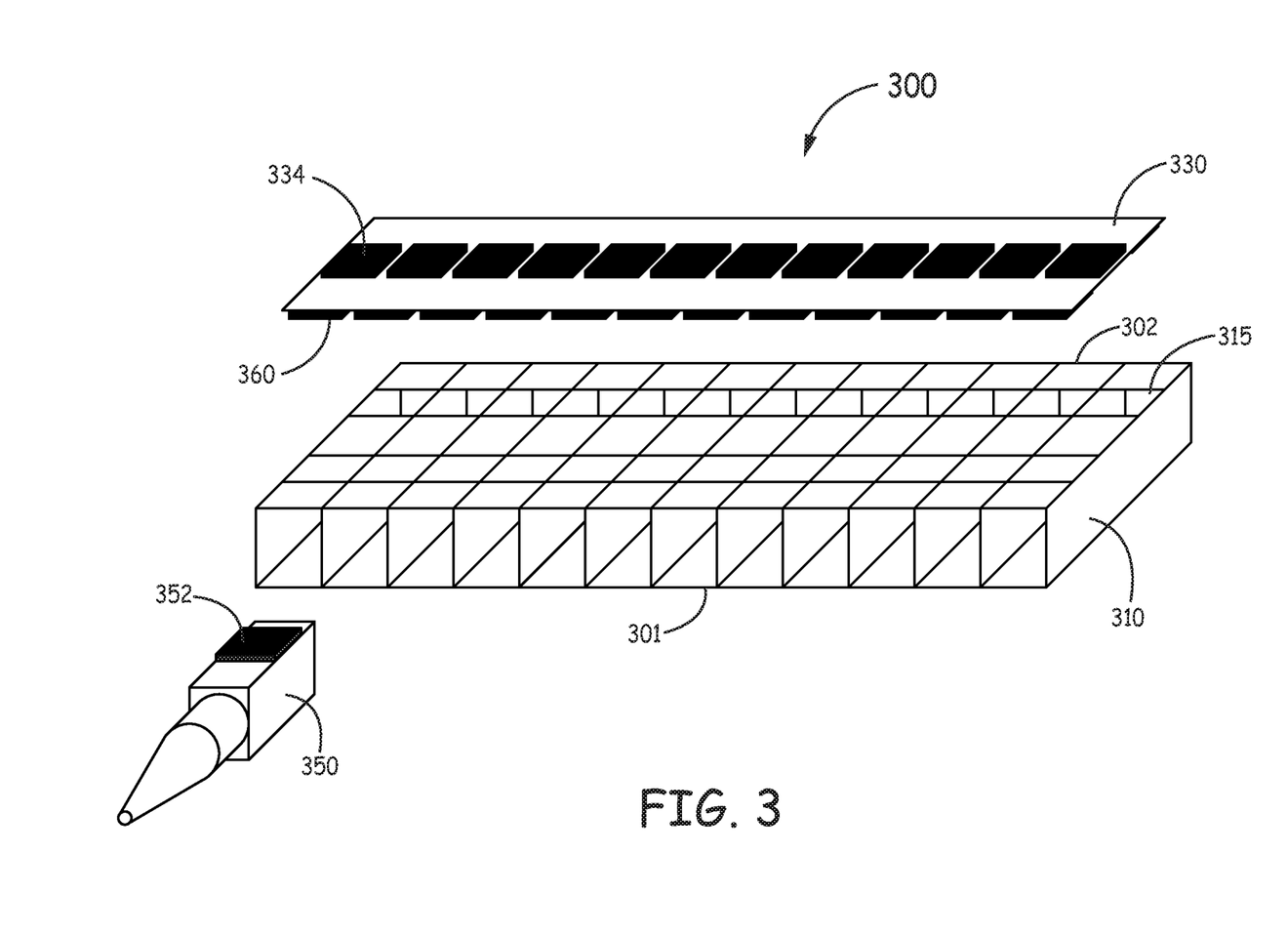
FIG. 3 is a block diagram of an exemplary embodiment of an adapter block.

FIG. 3 is a diagram illustrating an adapter pack assembly 300 having ports on opposing sides. In certain implementations, the adapter pack assembly 300 functions as one of adapter packs 170-173 in FIG. 1. The adapter block assembly 300 has front ports 301 and rear ports 302. Front ports 301 may receive optical connectors (e.g., optical connectors 350) when the adapter block assembly 300 is in a normal position. Alternatively, the rear ports 302 may receive the optical connectors when the adapter block assembly 300 is in a reversed position.

In at least one implementation, the adapter block assembly 300 includes a first adapter block 310A, a second adapter block 310B, a joining member 320, and a circuit board 330. The joining member 320 physically couples the first and second adapter blocks 310A, 310B together. The circuit board 330 couples to the joined first and second adapter blocks 310A, 310B. Contact assemblies 360 and circuit board components 334 (e.g., memory) are mounted to the circuit board 330. The contact assemblies 360 face towards the adapter blocks 310A, 310B. The cover 340 extends over at least some of the components 334 of the circuit board 330.

In a further example, a contact assembly 360 is disposed between the adapter block 310 and the circuit board 330. A front contact assembly 360 corresponds with the front ports 301 and a rear contact assembly 360 corresponds with the rear ports 212. Contacts of the contact assembly 360 extend through apertures 315 in the adapter block 310. The contacts are positioned and oriented so that the contact sections align with the contact region 352 of optical connectors 350 received at corresponding ports 301 and 302. In at least one implementation, the contact assembly 360 includes a GPIO for each of the front ports 301 and rear ports 302. In certain implementations, the GPIOs associated with the front ports 301 are tied to a high voltage and the GPIOs associated with the rear ports 302 are tied to a low voltage. When, the connector 350 is inserted into a front port 301, the contact region 352 of the connector 350 comes into contact with the GPIO pin in the contact assembly 360 that is associated with a front port 301. When the connectors 350 are connected to front ports 301, the assembly block 300 is in a normal position. However, the assembly block 300 may be placed within a frame assembly in a reversed position, such that the connectors 350 are connected to rear ports 302. When the connector 350 is inserted into a rear port 302, the contact region 352 of the connector 350 comes into contact with a GPIO pin in the contact assembly 360 that is associated with a rear port 302. When the connectors 350 are connected to rear ports 302, the assembly block 300 is in a reversed position, and the connector 350 generates an event that is communicated to a managing entity of the frame assembly that contains the adapter block assembly 300.

In certain exemplary embodiments, when the managing entity receives an event from the connector 350, the managing entity reverses the numbers assigned to the different ports. For example, in an adapter block 310 having 24 ports, a connector 350 connected into the first front port will cause the managing entity to identify the port as port 1 and incrementally assign numbers to the rest of the ports. However if the adapter block 310 is installed in a reverse position, the first port would be port 24 if the adapter block 310 were in the normal position. As described above, when the connector 350 is connected to the first rear port, the connector 350 sends an event to the managing entity that causes the managing entity to reassign the numbers that identify the ports. When there are 24 ports, the managing entity re-assigns port 1 to port 13, port 2 to port 14, port 3 to port 15, port 13 to port 1, port 14 to port 2, and so forth. Thus, the adapter block 310 may be installed in either the normal position or the reverse position without affecting the identification of the ports. As shown here, the adapter block may include different configurations. For example, the terms "rear" and "front" are merely intended to differentiate the location of the ports on the adapter block assembly.

Figure 4:
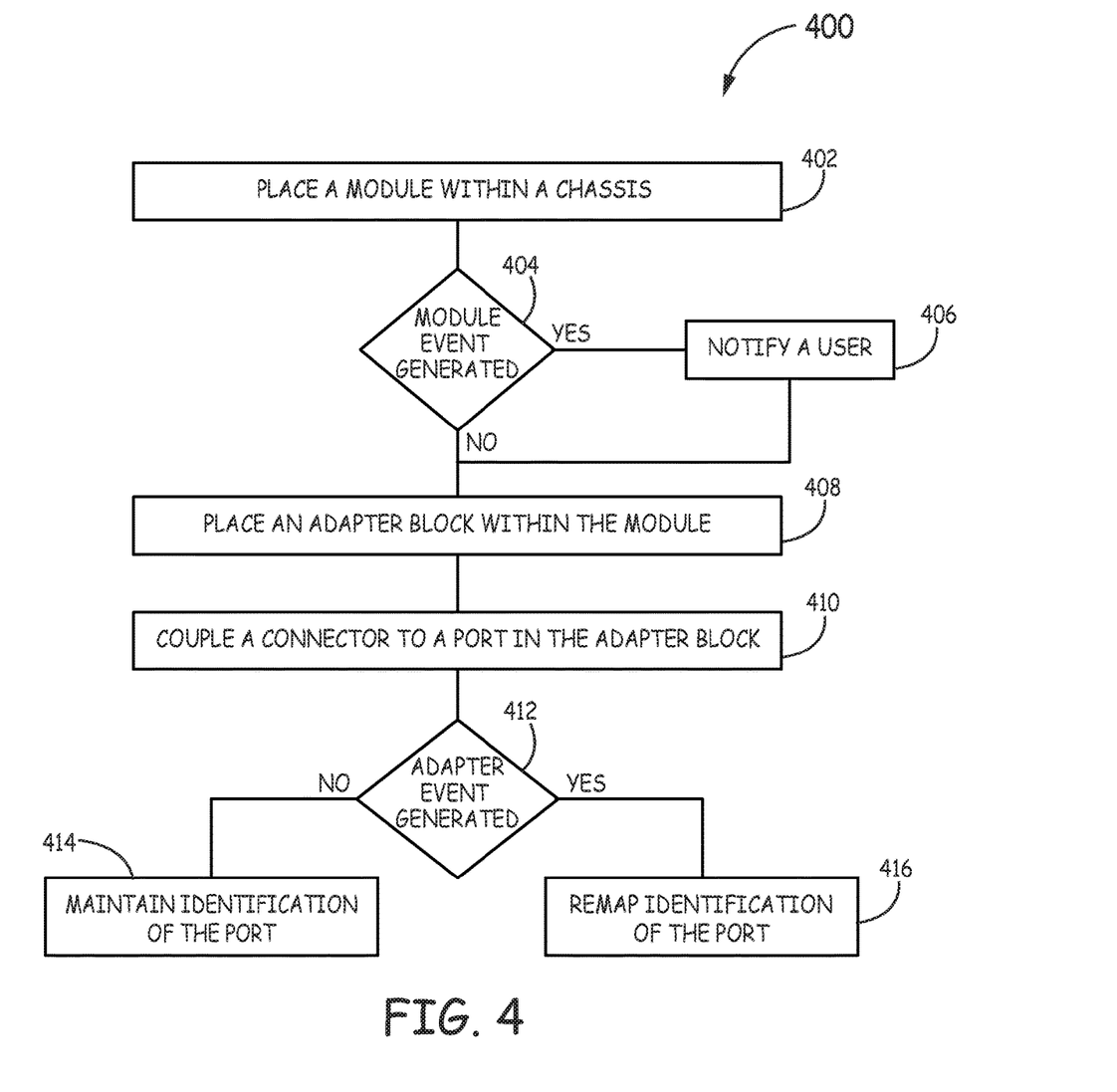
FIG. 4 is a flow diagram of an exemplary embodiment of a method for detecting module rotation within a communication sub-assembly.

FIG. 4 is a flow diagram of one exemplary embodiment of a method 400 of detecting component rotation within a communication sub-assembly (such as a chassis) that is inserted into a frame (or similar assembly into which multiple communication sub-assemblies can be inserted). The exemplary embodiment shown in FIG. 4 is described here as being implemented using the system shown in FIG. 1 and the adapter block 300 shown in FIG. 3, though it is to be understood that other embodiments can be implemented in other ways.

Method 400 comprises placing a module 150 within a chassis 130 (block 402). In one common usage scenario, the module 150 may be a slidable tray that is placed within the chassis 130. In certain implementations, it may be difficult for a user to differentiate the front side of the module 150 from the rear side of the module 150 as the two opposing sides of the module 150 may appear identical. Due to the difficulty in differentiating the different sides of the module 150, the module 150 may be installed in either a reverse position or a normal position within the chassis 130.

Method 400 also comprises determining if a module event is generated (block 404). In this example, the module 150 may include a GPIO pin. When the module 150 is installed in the reverse position, the GPIO pin may make contact in such a way that a signal is transmitted to the managing entity, where the managing entity interprets the reception of the signal as a generated module event. When the module 150 is installed in the normal position, no signal is generated or transmitted to the managing entity. In at least one exemplary implementation, method 400 includes notifying the user of the position of the module 150, when a module event is generated (block 406).

Further, method 400 comprises placing an adapter block 300 within the module 150 (block 408). In one common usage scenario, an adapter block 300 is placed within a module 150 located within the chassis 130. In certain implementations, it is difficult for a user to differentiate the front side of an adapter block from the rear side of an adapter block as the two opposing sides of the adapter block may appear and function substantially identical. Due to the difficulty in differentiating the different sides of the adapter block, the adapter block may be installed in either a reverse orientation or a normal orientation.

Method 400 further comprises coupling a connector 350 to a port in the adapter block (block 410). In this example, an optical connector 350 is connected to one of the ports in the adapter block 300. When the adapter block 300 is in the normal position, the connector 350 is connected to one of the front ports 301. In contrast, when the adapter block 300 is in the reverse position, the connector 350 is connected to one of the rear ports 302. In certain implementations, to correctly route information through the correct connector, a managing entity accurately identifies to which port the connector 350 is connected. However, if the adapter block 300 is installed in a reverse position, the port mappings will be incorrect Method 400 further comprises determining if an adapter event is generated (block 412). In this example, the ports on the adapter block 300 each include a GPIO pin. In the front ports 301, the GPIO pins may be tied to a logically high voltage. In contrast, in the rear ports 302, the GPIO pins may be tied to a logically low voltage. When the connector 350 is connected into a front port 301, the connector 350 connects to a GPIO pin that is tied to logical high and does not generate an event. However, when the connector 350 is connected into a rear port 302, the connector 350 connects to a GPIO pin that is tied to logical low and generates an event. The connector 350 then transmits the generated event to a managing entity over the chassis.

When an event is generated, method 400 further comprises remapping identification of the port (block 416). When a managing entity receives an event due to the adapter block 300 being installed in a reverse position, the managing entity remaps the identification for the front ports 301 and rear ports 302. In at least one example, where there are 12 front ports and 12 rear ports, ports 1-12 are front ports 301 and ports 13-24 are rear ports 302. When the managing entity receives the generated event, the managing entity remaps the ports such that ports 1-12 are rear ports 302 and ports 13-24 are front ports 301. Thus, after remapping the ports, the managing entity is able to identify the location of the ports within the chassis 130. When no event is generated (block 412), method 400 comprises maintaining the identification of the port (block 414). Thus, the managing entity remaps the ports upon the reception of an event, when no event is received, the managing entity maintains the original port identification.

Example Embodiments

Example 1 includes a system for detecting component rotation, the system comprising: a module; an adapter block installed in the module, the adapter block comprising a plurality of front ports and a plurality of rear ports configured to receive an optical connector; a managing entity configured to control port identification for the plurality of front ports and the plurality of rear ports; and a circuit board mounted to the adapter block, wherein the circuit board comprises a plurality of front contact assemblies and a plurality of rear contact assemblies, wherein each front port in the plurality of front ports is associated with a front contact assembly in the plurality of front contact assemblies and each rear port in the plurality of rear ports is associated with a rear contact assembly in the plurality of rear contact assemblies, wherein when a rear contact assembly is electrically coupled to a connector, the connector generates an event that is sent to the managing entity, whereupon the managing entity remaps the port identification for the plurality of front ports and the plurality of rear ports.

Example 2 includes the system of Example 1, wherein the rear contact assembly includes a rear general purpose input/output (GPIO) pin and the front contact assembly includes a front GPIO pin, where the rear GPIO pin produces a different signal from the front GPIO pin.

Example 3 includes the system of Example 2, wherein the front GPIO pin produces a logically high voltage and the rear GPIO pin produces logically low voltage.

Example 4 includes the system of any of Examples 1-3, wherein remapping the port identification for the plurality of front ports and the plurality of rear ports comprises reversing the number order of the ports.

Example 5 includes the system of any of Examples 1-4, wherein the managing entity notifies a user that the port identification has been remapped.

Example 6 includes the system of any of Examples 1-5, wherein the managing entity manages a frame assembly containing the adapter block.

Example 7 includes the system of any of Examples 1-6, wherein the adapter block is at least one of the following: an LC/LC adapter; an SC/SC adapter; and an MPO/MPO adapter.

Example 8 includes the system of any of Examples 1-7, wherein the module generates a module event for transmission to the managing entity when the module is installed within a chassis in a reversed position.

Example 9 includes the system of Example 8, wherein the managing entity notifies a user that the module is installed in a reversed position upon the reception of the module event.

Example 10 includes an optical distribution frame comprising: a frame structure defining a plurality of positions into which a plurality of chassis can be inserted; and a frame controller unit attached to the frame structure, the frame structure comprising: a frame controller; and at least one chassis, wherein the at least one chassis includes at least one module including at least one adapter block, wherein the adapter block comprises: a plurality of front ports and a plurality of rear ports configured to receive an optical connector; and a circuit board mounted to the adapter block, wherein the circuit board comprises a plurality of front contact assemblies and a plurality of rear contact assemblies, wherein each front port in the plurality of front ports is associated with a front contact assembly in the plurality of front contact assemblies and each rear port in the plurality of rear ports is associated with a rear contact assembly in the plurality of rear contact assemblies, wherein when a rear contact assembly is electrically coupled to a connector, the connector generates an event that is sent to the frame controller; a switch communicatively coupled to the frame controller; at least one cable attached to the switch and routed and attached to the optical distribution frame so that the at least one cable can be attached to the at least one chassis inserted into a predetermined one of the plurality of positions in the optical distribution frame; wherein the frame controller is configured to communicate port mapping information and the event to a management entity that is communicatively coupled to the frame controller, whereupon the managing entity remaps the port identification for the plurality of front ports and the plurality of rear ports when the event is received.

Example 11 includes the system of Example 10, wherein the rear contact assembly includes a rear general purpose input/output (GPIO) pin and the front contact assembly includes a front GPIO pin, where the rear GPIO pin produces a different signal from the front GPIO pin.

Example 12 includes the system of Example 11, wherein the front GPIO pin produces a logically high voltage and the rear GPIO pin produces logically low voltage.

Example 13 includes the system of any of Examples 10-12, wherein remapping the port identification for the plurality of front ports and the plurality of rear ports comprises reversing the number order of the ports.

Example 14 includes the system of any of Examples 10-13, wherein the managing entity notifies a user that the port identification has been reassigned.

Example 15 includes the system of any of Examples 10-14, wherein the management entity associates location information with the plurality of rear ports and the plurality of front ports.

Example 16 includes the system of any of Examples 10-15, wherein the adapter block is at least one of the following: an LC/LC adapter; an SC/SC adapter; and an MPO/MPO adapter.

Example 17 includes the system of any of Examples 10-16, wherein the at least one module generates a module event for transmission to the managing entity when the at least one module is installed within the at least one chassis in a reversed position.

Example 18 includes the system of Example 17, wherein the managing entity notifies a user that the at least one module is installed in a reversed position upon the reception of the module event.

Example 19 includes a method for detecting component rotation, the method comprising: placing a module within a chassis; placing an adapter block within the module; coupling a connector to a port in the adapter block; determining whether the module generates a module event; determining whether the connector generates an adapter event; and when the connector generates the adapter event, remapping identification of the port.

Example 20 includes the method of Example 19, wherein the adapter block comprises: a plurality of front ports and a plurality of rear ports configured to receive optical connectors; and a circuit board mounted to the adapter block, wherein the circuit board comprises a plurality of front contact assemblies and a plurality of rear contact assemblies, wherein each front port in the plurality of front ports is associated with a front contact assembly in the plurality of front contact assemblies and each rear port in the plurality of rear ports is associated with a rear contact assembly in the plurality of rear contact assemblies, wherein when a rear contact assembly is electrically coupled to a connector, the connector generates adapter events for transmission to a managing entity.

Example 21 includes the method of Example 20, wherein the rear contact assembly includes a rear general purpose input/output (GPIO) pin and the front contact assembly includes front GPIO pin, where the rear GPIO pin produces a different signal from the front GPIO pin.

Example 22 includes the method of Example 21, wherein the front GPIO pin produces a logically high voltage and the rear GPIO pin produces logically low voltage.

Example 23 includes the method of any of Examples 19-22, wherein remapping identification of the port comprises: transmitting the adapter event to a managing entity; and reversing the order of the ports.

Example 24 includes the method of Example 23, wherein the managing entity notifies a user that the port identification has been reassigned.

Example 25 includes the method of any of Examples 19-24, wherein determining whether the module generates a module event comprises: detecting when the module is installed in a reverse position; and when the module is installed in a reverse position, generating a module event for transmission to a managing entity.

Example 26 includes the method of Example 25, wherein the managing entity notifies a user that the module is installed in the reverse position.

A number of embodiments have been described. Nevertheless, it will be understood that various modifications to the described embodiments may be made without departing from the spirit and scope of the claimed invention. Also, combinations of the individual features of the above-described embodiments are considered within the scope of the inventions disclosed here.

What is claimed is:

1. A method for mapping ports, the method comprising:
    placing an adapter block within a module installed within a chassis in one of at least two orientations, wherein the adapter block comprises at least a first port on a first side of the adapter block and a second port on a second side of the adapter block;
    detecting an event associated with a connector being coupled to a port of the adapter block;
    determining in which of the at least two orientations the adapter block is placed within the module based on whether the connector is coupled to the first port or the second port as detected from the detecting of the event; and
    assigning a port identification to the port in response to the determination of in which of the at least two orientations the adapter block is placed within the module;
    wherein the adapter block comprises:
        a plurality of front ports on a front side and a plurality of rear ports on a rear side configured to receive optical connectors; and
        a circuit board mounted to the adapter block, wherein the circuit board comprises a plurality of front contact assemblies and a plurality of rear contact assemblies, wherein each front port in the plurality of front ports is associated with a front contact assembly in the plurality of front contact assemblies and each rear port in the plurality of rear ports is associated with a rear contact assembly in the plurality of rear contact assemblies,
        wherein when a rear contact assembly is electrically coupled to a connector, adapter events are generated for transmission to a managing entity;
        wherein the rear contact assembly includes a rear general purpose input/output (GPIO) pin and the front contact assembly includes front GPIO pin, where the rear GPIO pin produces a different signal from the front GPIO pin.

2. The method of claim 1, wherein the front GPIO pin produces a logically high voltage and the rear GPIO pin produces logically low voltage.

3. The method of claim 1, further comprising:
    placing the module within the chassis;
    determining whether the module generates a module event;
        wherein determining whether the module generates a module event comprises: detecting when the module is installed in a reverse position; and
        when the module is installed in a reverse position, generating a module event for transmission to a managing entity.

4. The method of claim 3, wherein the managing entity notifies a user that the module is installed in the reverse position.

5. A method for mapping ports, the method comprising:
    placing an adapter block within a module installed within a chassis in one of at least two orientations, wherein the adapter block comprises at least a first port on a first side of the adapter block and a second port on a second side of the adapter block;
    detecting an event associated with a connector being coupled to a port of the adapter block;
    determining in which of the at least two orientations the adapter block is placed within the module based on whether the connector is coupled to the first port or the second port as detected from the detecting of the event; and
    assigning a port identification to the port in response to the determination of in which of the at least two orientations the adapter block is placed within the module;
    wherein the adapter block comprises:
        a plurality of front ports on a front side and a plurality of rear ports on a rear side configured to receive optical connectors; and
        a circuit board mounted to the adapter block, wherein the circuit board comprises a plurality of front contact assemblies and a plurality of rear contact assemblies, wherein each front port in the plurality of front ports is associated with a front contact assembly in the plurality of front contact assemblies and each rear port in the plurality of rear ports is associated with a rear contact assembly in the plurality of rear contact assemblies,
        wherein when a rear contact assembly is electrically coupled to a connector, adapter events are generated for transmission to a managing entity;
        wherein mapping the identification of the port comprises:
    transmitting the adapter event to the managing entity; and
    reversing an order in which the plurality of front ports and the plurality of back ports are mapped.

6. The method of claim 5, wherein the managing entity notifies a user that the port identification has been reassigned.

7. A method for mapping ports, the method comprising:
    placing an adapter block within a module installed within a chassis in one of at least two orientations, wherein the adapter block comprises at least a first port on a first side of the adapter block and a second port on a second side of the adapter block;
    detecting an event associated with a connector being coupled to a port of the adapter block;
    determining in which of the at least two orientations the adapter block is placed within the module based on whether the connector is coupled to the first port or the second port as detected from the detecting of the event; and assigning a port identification to the port in response to the determination of in which of the at least two orientations the adapter block is placed within the module;

wherein the adapter block comprises:
- a plurality of front ports on a front side and a plurality of rear ports on a rear side configured to receive optical connectors; and
- a circuit board mounted to the adapter block, wherein the circuit board comprises a plurality of front contact assemblies and a plurality of rear contact assemblies, wherein each front port in the plurality of front ports is associated with a front contact assembly in the plurality of front contact assemblies and each rear port in the plurality of rear ports is associated with a rear contact assembly in the plurality of rear contact assemblies, wherein when a rear contact assembly is electrically coupled to a connector, adapter events are generated for transmission to a managing entity, whereupon the managing entity remaps the port identification for the plurality of front ports and the plurality of rear ports based on an orientation of the adapter block.

8. The method of claim 7, wherein the rear contact assembly includes a rear general purpose input/output (GPIO) pin and the front contact assembly includes front GPIO pin, where the rear GPIO pin produces a different signal from the front GPIO pin.

9. The method of claim 8, wherein the front GPIO pin produces a logically high voltage and the rear GPIO pin produces logically low voltage.

10. The method of claim 8, wherein mapping the identification of the port comprises:
- transmitting the adapter event to the managing entity; and
- reversing an order in which the plurality of front ports and the plurality of back ports are mapped.

11. The method of claim 10, wherein the managing entity notifies a user that the port identification has been reassigned.

* * * * *